May 27, 1958
F. M. MOORE
2,836,439
SWIVEL JOINT WITH SEALING MEANS PERMITTING
PIVOTAL MOVEMENT
Filed April 23, 1956
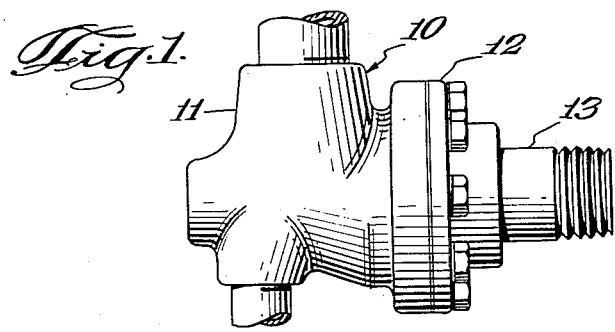
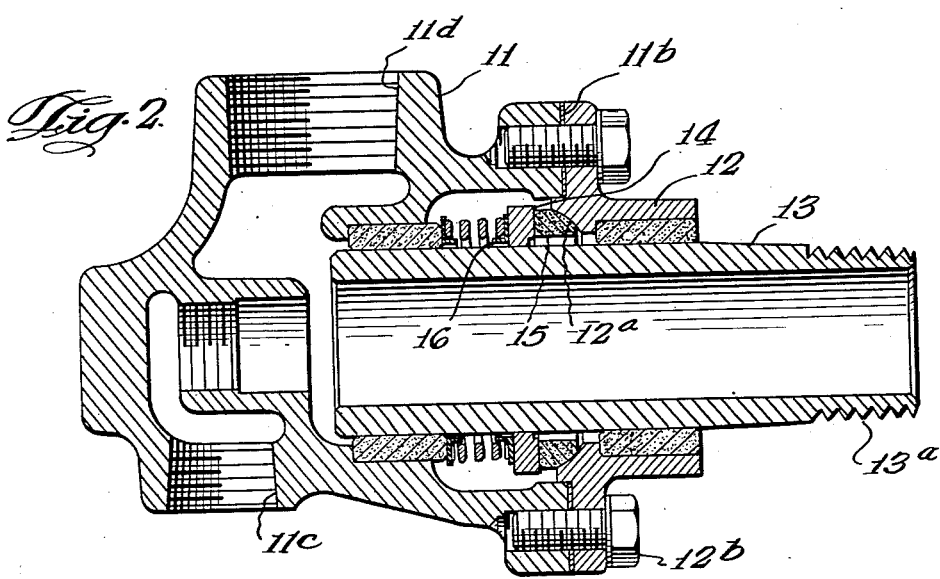
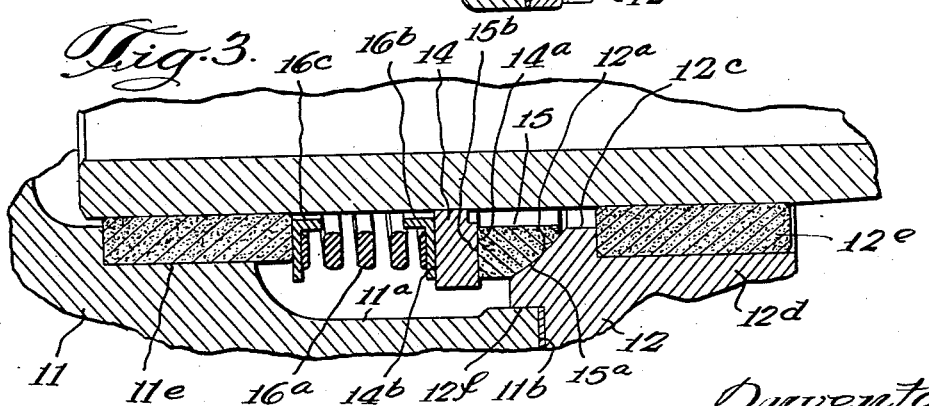
Inventor
Frank M. Moore
By Schroeder, Hofgren, Brady & Wegner
attorneys

United States Patent Office 2,836,439
Patented May 27, 1958

2,836,439

SWIVEL JOINT WITH SEALING MEANS PERMITTING PIVOTAL MOVEMENT

Frank M. Moore, Evanston, Ill., assignor to Francis N. Bard

Application April 23, 1956, Serial No. 579,997

1 Claim. (Cl. 285—279)

This invention relates to a revolving joint and in particular to a revolving joint having new and improved sealing means.

In the revolving or swing joints presently known in the art certain serious disadvantages are found. One such disadvantage is that in such joints utilizing carbon sealing elements, tensional forces are often developed in the sealing elements causing them to break or otherwise fail. Where relatively high pressure fluids are handled in the joint this problem is particularly troublesome. Another serious disadvantage is the use in such joints of a substantial number of separate elements which must be installed and removed in maintaining the joint.

A principal feature of this invention is the provision of a new and improved revolving joint adapted for use over a relatively wide range of fluid pressures and having simple construction.

Another feature of the invention is the provision of a self lubricating revolving joint having a sealing ring formed of a material having relatively high compression strength and relatively low tension strength, with the elements of the joint associated with the sealing ring arranged to produce only compressional forces in the ring.

A further feature is that the joint comprises a housing member, a first bearing element on the housing member, a second bearing element movable relative to the first bearing element, and a sealing ring extending between the bearing elements and sealingly engaging surfaces of each of the elements, said surfaces facing inwardly or radially relative to the axis of the ring.

A still further feature is that the surface of the bearing element on the housing member is concave radially inwardly facing and that the surface of the second bearing element is radially extending.

Still another feature of the invention is that the joint includes a hollow housing, a tubular sleeve extending into said housing and having a collar thereon in the housing, a sealing ring on one side of said collar extending between the collar and an element of the housing, and spring means on the other side of the collar acting between the collar and another element of the housing, whereby the sleeve may be rotated relative to the housing while being sealingly secured thereto and while accommodating both lateral and angular axial displacement of the sleeve relative to the housing.

Other features and advantages of the invention will be apparent from the following description taken in connection with the accompanying drawings wherein:

Fig. 1 is an elevational view of a revolving joint embodying the invention;

Fig. 2 is an enlarged diametrical sectional view thereof; and

Fig. 3 is a further enlarged, fragmentary sectional view of a portion thereof.

In the exemplary embodiment of the invention as disclosed in the drawings a revolving joint is shown to include a generally hollow housing 10 comprising a casing 11 having sealingly secured thereto a cap 12. Extending through the cap to terminate interiorly of casing 11 is a tubular sleeve 13 which is journaled in the casing and cap to have free rotation about its axis. Within casing 11 the sleeve is provided with a collar 14. An annular sealing ring 15 is arranged to extend between collar 14 and a bearing surface or seat 12a on cap 12. Bearing directly against the opposite side of collar 14 to urge the collar against ring 15 and thereby to urge ring 15 against seat 12a, is a yieldable means 16.

I have found that by arranging the elements of my joint as hereinafter more fully described, satisfactory functioning thereof is obtained with fluid pressures therein ranging from substantially zero pounds per square inch to very substantial pressures.

Casing 11 is provided with a stepped bore 11a opening at one end through an end surface 11b of the casing. At the other end, bore 11a is in fluid conductive communication with suitable connecting passages such as passages 11c and 11d which may be threaded for connection thereto of suitable pipes. At the inner end, bore 11a is arranged to receive, under compression, an annular bushing 11e which serves as means for journaling the inner end of sleeve 13.

Cap 12 extends radially coextensively with casing surface 11b and is secured to the casing in sealing engagement with surface 11b by suitable means such as bolts 12b. Centrally of cap 12 is an opening 12c having a diameter substantially larger than the outer diameter of sleeve 13, thereby permitting the sleeve to extend freely therethrough. Extending longitudinally outwardly and coaxially of opening 12c is a tubular portion 12b arranged to receive, under compression, a bushing 12e, generally similar to bushing 11e, and arranged to provide a second journal means for rotatively carrying the sleeve.

Seat 12a is arranged on the inner side of cap 12 oppositely of tubular portion 12d and faces toward casing bore 11a and radially inwardly. In the preferred form seat 12a is segmentally spherical and, thus, presents a concave, inwardly facing bearing surface. Cap 12 is enlarged concentrically of seat 12a to project longitudinally inwardly and form an annular shoulder 12f having a close fit with casing 11 in the outer end of bore 11a and thereby acting as an automatic centering means to align cap 12 coaxially with bore 11.

Sleeve 13 is generally tubular and may be provided with a tapered, threaded outer end 13a for connecting a suitable duct (not shown) in fluid conductive relationship with the sleeve. Collar 14, which may be integral with or sealingly fixed around sleeve 13 intermediate the sleeve ends, is provided with a longitudinally outer surface 14a which preferably extends radially to the axis of the sleeve and may be lapped to provide improved movable sealing engagement with ring 15. The opposite or longitudinally inner side 14b of the collar extends radially to have slidable, bearing engagement with yieldable means 16.

Sealing ring 15 is preferably formed of a material having high compression strength and low tension strength such as carbon and is provided with an outwardly facing sealing surface 15a complementary to seat 12a, and a radial surface 15b complementary to collar surface 14a. Thus, when collar 14 is urged toward seat 12a, a movable sealing connection between the collar and the cap is effected. Because no force is directed against sealing ring 15 having a radially outwardly directed component, all stresses produced in sealing ring 15 are compressional and, as the ring has relatively high compression strength, substantial pressures may be accommodated in the joint without adverse effect. Thus, each of sealing ring 15 and bushings 11e and 12e may be formed of carbon making the joint self-lubricating.

It should be noted that although I have described one embodiment of the invention wherein the inwardly facing concave seat is provided on cap 12 and a radial bearing surface is provided on collar 14, a reverse positioning of these elements would function similarly and thus is within the scope of the invention. The inventive concept comprehends any such seating surface configurations which act to produce only inwardly or longitudinally directed forces in the sealing ring and to preclude development of any outwardly directed forces therein.

Yieldable means 16 comprises a helical spring 16a, a first spring guide 16b in slidable engagement with collar surface 14b, and a second spring guide 16c in slidable engagement with bushing 11e. Spring 16a is under suitable compression between guides 16b and 16c to urge collar 14 longitudinally outwardly and effect suitable sealing engagement of sealing ring 15 with collar surface 14a and cap seat 12a when the pressure within casing 11a is relatively low. Because of the slidable engagement of yieldable means 16 with bushing 11e and collar 14, sleeve 13 may be rotated relative to the casing without affecting the urging action of means 16.

The arrangement of the sealing elements in the joint allows for some lateral or angular displacement of the axis of sleeve 13, such as caused by whip or lack of concentricity of the duct connected to the sleeve. Thus, for example, should the axis of sleeve 13 be displaced slightly upwardly as seen in Fig. 2, ring surface 15b would engage a slightly lower portion of collar surface 14a, a suitable seal being established therebetween as when the sleeve is axially centered. As a further example, should the axis of sleeve 13 be tilted relative to the axis of bore 11a, the spherical configurations of seat 12a and ring surface 15a allow the axis of sealing ring 15a to be tilted correspondingly, a satisfactory seal being effected between surface 15a and seat 12a as when the sleeve is coaxially aligned. As the angular displacement of the sealing ring axis is comparable to the angular displacement of the sleeve axis, ring surface 14a and collar surface 15b maintain their parallel relationship and no effect is had on their sealing engagement. The resultant angular displacement of the axis of yieldable means 16 is readily accommodated by the yieldable nature of spring 16a so that spring guards 16b and 16c may maintain their facial sliding engagement with collar 14 and bushing 11e as when the sleeve axis is coaxially aligned.

Thus, my revolving joint is adapted to function properly over a substantial range of pressures and accommodates both lateral and angular axial displacement of the sleeve and duct connected thereto, while yet being extremely simple and economical of manufacture. While I have shown and described certain embodiments of my invention, it is capable of many modifications. Changes, therefore, in the construction and arrangement may be made without departing from the spirit and scope of the invention as defined in the appended claim.

I claim:

A revolving joint of the character described comprising: a housing having a chamber therein and an opening into the chamber; a first carbon bearing adjacent the opening and a second carbon bearing fixed in the chamber and spaced from the first bearing; a sleeve extending through the opening and into the chamber and rotatably carried in said bearings; a collar sealingly engaging the outer surface of the sleeve intermediate said bearings and having a first sealing surface lying in a plane normal to the axis of the sleeve; means formed in the housing defining an annular segmentally spherical second sealing surface surrounding said sleeve intermediate said bearings and facing the collar; an annular sealing ring disposed between and engaging the sealing surfaces, the portions of the ring engaging each of said sealing surfaces being complementary thereto; a spring surrounding the sleeve and bearing at one end against the second bearing and at its other end against the collar to urge said sealing surfaces into sealing engagement with the ring, the contacting surfaces of the ring and the sealing surfaces being smooth and free of discontinuities to permit both rotational and pivotal movement of the sleeve relative to the housing without disengaging the contacting surfaces from said sealing surfaces, said housing having an annular chamber portion therein surrounding the spring, collar and ring, with the ring having an inner diameter greater than the outer diameter of the sleeve and having an outer diameter less than the diameter of said annular chamber portion.

References Cited in the file of this patent

UNITED STATES PATENTS

| | | |
|---|---|---|
| 1,270,172 | Knudsen | June 18, 1918 |
| 1,769,905 | Berry | July 1, 1930 |
| 1,795,541 | Brownell | Mar. 10, 1931 |
| 2,395,861 | Fraser | Mar. 5, 1946 |
| 2,497,183 | Monroe | Feb. 14, 1950 |